May 2, 1939.  J. F. ROBB  2,156,482
CONFECTION AND NOVELTY TOY
Filed June 29, 1937
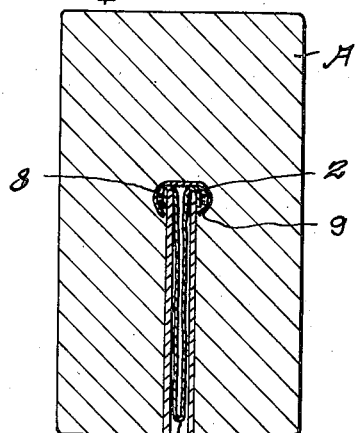
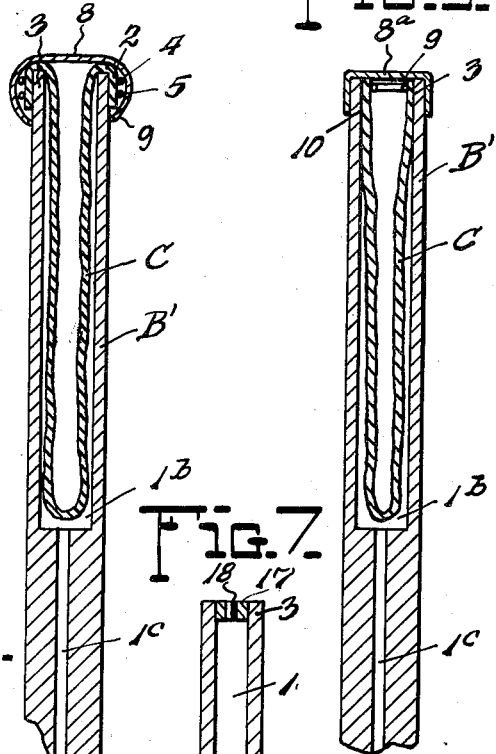
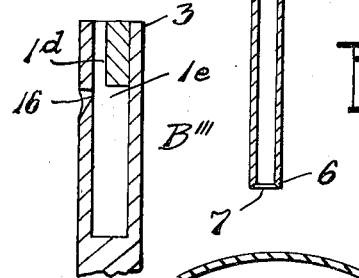
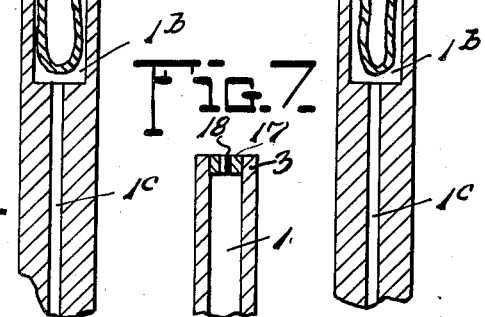
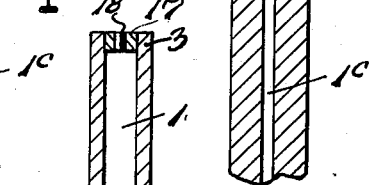
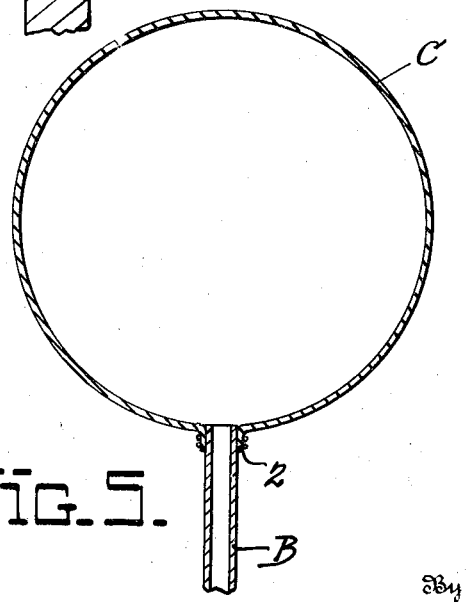
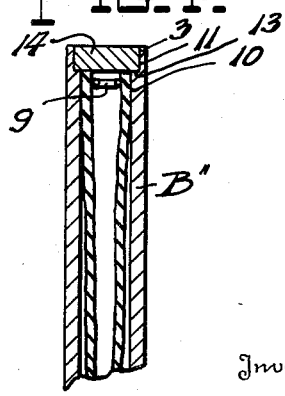
Inventor
JOHN F. ROBB.
By Robb & Robb
Attorneys Patented May 2, 1939

2,156,482

UNITED STATES PATENT OFFICE 2,156,482

CONFECTION AND NOVELTY TOY

John F. Robb, Cleveland Heights, Ohio

Application June 29, 1937, Serial No. 151,012

2 Claims. (Cl. 46—87)

This invention relates to novelty amusement devices, wherein a mouthpiece is employed in conjunction with a device attached thereto adapted to be operated by the expulsion of air from the oral cavity of the user into the mouthpiece when a portion of the same is surrounded by the lips of the user.

The invention has to do more particularly with the provision in such a device of a mouthpiece having utility as a handle member to one portion of which is attached an inflatable device such as a rubber balloon, and another portion of which is intended to be inserted into the mouth of the user for the purpose of inflating the balloon by the expulsion of air from the mouth of the user, provision further being made in the handle or mouthpiece portion of the device for containing within the same the inflatable device such as rubber balloon or the like when the latter is in deflated or quiescent condition.

Novelty amusement devices of the type employing in conjunction with mouthpieces, rubber balloons, or other devices, operated by the expulsion of air from the mouth of the user thereinto, have particular attraction for children, as do confections of the candy sucker or ice cream sucker type, wherein a candy confection or ice cream confection is mounted upon a stick or handle which may be held by the person eating the same while the candy or ice cream confection is being eaten, whereby to avoid contact of the confection with the hands of the user during the process of eating.

To increase the attractiveness to children of confections of this type, I contemplate the employment in such a confection of a combination handle and mouthpiece having secured to the portion inserted into the confection, a rubber balloon, or other device, adapted to be operated by the blowing of air into the mouthpiece, whereby to provide a confection of dual attractiveness, the handle of which, when the confection has been eaten, becomes operative as a novelty amusement device which will be retained and utilized by the child purchasing the confection long after the confection itself has been forgotten.

It is, therefore, to be seen that a primary though not necessarily the only object of my invention providing a combination handle and mouthpiece in conjunction with an inflatable device adapted to be contained therein in quiescent state, is to utilize said device in combination with a confection of the type employing a handle.

Within the purview of my invention is contemplated the employment of a handle member, to be used in conjunction with a confection or otherwise, having a hollow portion to contain an air operated device, such device not necessarily being operatively secured to the handle member.

My invention is now to be more particularly described in connection with the accompanying drawing, in which:

Figure 1 illustrates a confection of ice cream, candy, or the like, employing the combination handle and mouthpiece of my invention, having attached thereto and contained therein, a deflated rubber balloon.

Figure 2 illustrates the combination handle and mouthpiece of Figure 1, more particularly showing the manner in which the balloon is contained therein in deflated condition.

Figure 3 is a view similar to Figure 2, showing a different method of attachment of the balloon to the combination handle and mouthpiece.

Figure 4 is a view similar to Figures 2 and 3 illustrating a different manner of enclosing the balloon within the handle member.

Figure 5 illustrates the balloon in inflated condition, as it will be used after the confection has been eaten.

Figure 6 illustrates a modified form of the handle member in the form of a whistle.

Figure 7 illustrates a handle member of the invention employing a whistle member operatively attached at one end thereof.

Referring first to Figures 1 and 2, A indicates the body of an ice cream or candy confection; B indicates the combination handle and mouthpiece, and C indicates a rubber balloon, contained within a hollow portion 1 of the stick B.

The valve or neck portion 2 of the balloon C, surrounds and is secured to the inner end portion 3 of the handle member B by means of bands 4 and 5, which may be of any suitable kind, but preferably ordinary rubber bands may be used for this purpose. The hollow portion of the handle or mouthpiece in which the balloon is contained in deflated condition may be of the same diameter throughout the length of the said handle as in Figure 1, or an enlarged portion 1b may be provided as in Figure 2, for containing the balloon in deflated condition, and a portion 1c of less diameter may extend from the portion 1b to the end portion 6 which is the portion which will be inserted into the mouth of the user when the balloon is desired to be inflated. An opening 7 is, of course, provided for the passage of air from the mouth of the user to the interior of the handle.

It is desirable in the use of the device of the handle B or B' with its attached balloon C in a confection of ice cream or candy, to prevent contact of any portion of the balloon with the ice cream or candy of such confection, and for the purpose of preventing such contact a cap 8 of Cellophane or any suitable material is placed over the end of the handle B in such a manner as to cover the neck or valve portion 2 of the balloon which would otherwise be exposed to contact with the confection. If a material such as Cellophane or wax paper is used for the purpose of the protective cap member 8, the portion 9 thereof may be twisted about the handle B to ensure against its unauthorized displacement, while serving its purpose to prevent any portion of the balloon coming into contact with the confection.

In Figures 3 and 4, the neck or valve portion 2 of the balloon is shown as being secured within the inner end portion 3 of the handle member B', a ring or band member 9, which may be of any suitable material, being provided and such member being adapted to securely hold the neck portion 2 of the balloon against the inner wall 10 of the handle member. When the balloon is attached to the handle in this manner, a cap 8a may be provided adapted to closely fit the end portion 3 of the handle member, and for this purpose the cap 8a may be made of wood or other suitable non-metallic material, or a cap of Cellophane may be used as previously described.

In Figure 4 the handle member B'' is provided at its inner end with a wall 11 of less diameter than the wall 12 which surrounds the space adapted to contain the balloon in deflated condition. Adapted to fit closely within the wall portion 11, and adapted to seat upon the shoulder 13 is a cap member 14 which may be a block of wood or other suitable non-metallic material, for the purpose of preventing contact of any portion of the balloon with the confection. In this Figure 4, the neck portion of the balloon is secured to the inner portion of the handle member B'' in a similar manner to that illustrated in Figure 3.

In the use of my device as a handle member for an ice cream or candy confection, the person purchasing the same will hold the confection during eating by means of the handle member and after consuming the confection will then insert the portion 6 into his mouth compressing his lips thereabout, and expel air from his mouth through the opening 7 into the inner hollow portion of the combination handle and mouthpiece member, thereby forcing the balloon which is contained therein outwardly until the force of the air expelled from the mouth causes the balloon to come into contact with the cap member and to push the cap member outwardly and disassociate it from its position at the inner end of the handle member. The force of the air expelled from the mouth of the user into the hollow portion of the handle member will then expel the balloon outwardly through the end portion 3 of the said handle member and inflate the balloon as shown in Figure 5.

It will be understood, of course, that the handle member of my invention may be formed with a hollow portion which need not extend throughout the length of said handle member, but may serve merely as a compartment for containing an air operated device. For example, the handle B' may be formed with the hollow portion 1b only without the communicating passage 1c. The balloon or other air operated device in such instance will be merely contained within the portion 1b, so that the user may at his pleasure remove it therefrom and employ such device without reference to the handle member.

In Figure 6 is shown a modified handle member in the form of a whistle. For this purpose, the handle B''' has a notched portion 16 providing a passage from the inner hollow portion 1e to the outer surface of the handle. A passage 1d of smaller diameter than the hollow portion 1c extends from the latter to the open end 3. After the confection of which the handle member forms a part is eaten, said handle member becomes operative as a whistle when the user places the end portion 3 to his lips in the usual manner.

In Figure 7 is illustrated a handle having positioned inwardly of the end portion 3 a whistle member 17, provided with an opening 18 therethrough, which may be operated, after the confection is consumed, by the air expelled from the lips of the user through the opening 7 and into the hollow portion 1.

Having thus described my invention, what I claim as new and desire to secure by Letters Patent of the United States, is:

1. In a novelty amusement device, in combination, a handle member having a central hollow portion, and an inflatable device secured to one end of said handle member and forced within said hollow portion in deflated condition so that its outer side, which would be innermost when the inflatable device is inflated, lies against the inner wall of the hollow portion of the handle, the said handle member having an opening for the admission of air under pressure into said hollow portion for projecting said device from the said hollow portion and for inflation of said inflatable device.

2. In a novelty amusement device of the class described, in combination, a handle member having a central hollow portion, an inflatable balloon device the neck portion of which is secured to one end of said member, said device having the side thereof, which would be outermost when the balloon is inflated and exterior to the handle, turned inward into the handle so the balloon extends longitudinally within the handle while deflated, with said outermost side facing the walls of the hollow portion of the handle, the other end of said handle member having an opening communicating with said hollow portion for the admission of air under pressure thereinto for inflation of the inflatable device, and a cap member sealing the first mentioned end of said handle member.

JOHN F. ROBB.